United States Patent [19]

Tsunoda

[11] 4,207,023
[45] Jun. 10, 1980

[54] MULTISTAGE HYDRAULIC MACHINE

[75] Inventor: Sachio Tsunoda, Yokohama, Japan

[73] Assignee: Tokyo Shibaura Electric Company Limited, Kanagawa, Japan

[21] Appl. No.: 913,855

[22] Filed: Jun. 8, 1978

[51] Int. Cl.$^2$ ............................................. F01D 3/00
[52] U.S. Cl. ............................................. 415/106
[58] Field of Search ........... 415/104, 106, 107, 169 R, 415/105

[56] References Cited

U.S. PATENT DOCUMENTS

| | | | |
|---|---|---|---|
| 782,272 | 2/1905 | Ray | 415/106 |
| 896,585 | 8/1908 | Salzer | 415/106 |
| 971,851 | 10/1910 | Krogh | 415/106 X |
| 1,151,964 | 8/1915 | Peterson | 415/106 |
| 1,151,965 | 8/1913 | Peterson | 415/106 |
| 1,385,115 | 8/1920 | Cone | 415/199.1 X |
| 3,874,812 | 4/1975 | Hanagarth | 415/106 |
| 4,086,020 | 4/1978 | Tanabe | 415/106 |

*Primary Examiner*—Leonard E. Smith
*Attorney, Agent, or Firm*—Oblon, Fisher, Spivak, McClelland & Maier

[57] ABSTRACT

A multistage hydraulic machine is provided with an outer backchamber, an inner backchamber and a sidechamber around the runners of each stage.

A piping having a control valve is provided between the outer back chamber in the highest pressure-stage and the sidechamber in the lowest pressure-stage.

Moreover, the outer backchamber is connected to the sidechamber for the runners of the high-pressure-stage.

4 Claims, 2 Drawing Figures

MULTISTAGE HYDRAULIC MACHINE

BACKGROUND OF THE INVENTION

1. Field of the Invention

This invention relates to a multistage hydraulic machine for a pumped-storage or a hydro-electric power plant, and more particularly to a multistate pump, turbine or pump-turbine including an outer backchamber, an inner backchamber and a sidechamber around the runners of each stage, and forming complicated water passages.

2. Description of the Prior Art

It is now explained that a prior art two-stage hydraulic machine is shown in FIG. 1 as one example of the hydraulic machine. In FIG. 1 a numeral 1 represents a runner of a lowpressure-stage, a numeral 2 represents guide vanes of the lowpressure-stage, a numeral 3 represents a runner of a highpressure-stage and a numeral 4 represents guide vanes of the highpressure-stage. The lowpressure-stage is coupled in series to the highpressure-stage through a return pipe 5. Moreover, for the highpressure-stage a casing 7 is provided to the periphery of the guide vanes 4, and for the lowpressure-stage a draft tube 6 is provided to the outlet side on the water-turbine operation. Furthermore, a turbine generator (not shown), which acts as a generator on the water-turbine operation and acts as a motor on the pump-turbine operation, is coupled to a shaft. In a main passage explained above, the chamber around the runners, which takes part in causing an axial water thrust, comprises an outer backchamber 8a, an inner backchamber 9a, a side backchamber 10a and a runner outlet portion 11a in the lowpressure-stage, and an outer backchamber 8b, inner backchamber 9b, a sidechamber 10b and a runner outlet portion 11b in the highpressure-stage.

In the hydraulic machine of a multistage pump-turbine having the passage explained above, the axial water thrust which acts on the runner 1 of the lowpressure-stage is given by multiplying the area and water pressure in each chamber of pressure described above, i.e. by summing each hydraulic load in each chamber of pressure as in following equation 1.

$$T_1 = Ta_1 + Tb_2 - Tc_1 - Td_1 - Tr_1 \quad (1)$$

Where, $T_1$: axial water thrust $Ta_1$: hydraulic load in the outer backchamber 8a (the load normally acts downward in FIG. 1)

$Tb_1$: hydraulic load in inner backchamber 9a (the load normally acts downward in FIG. 1)

$Tc_1$: hydraulic load in the sidechamber 10a (the load normally acts upward in FIG. 1)

$Td_1$: hydraulic load in the runner outlet portion 11a (the load normally acts upward in FIG. 1)

$Tr_1$: reaction force caused by a water flow in the runner (the reaction force normally acts upward in FIG. 1)

On the other hand, the axial water thrust, which acts on the runner 3 in the highpressure-stage, is similarly found by substituting from the suffix 1 to the suffix 2 in above-mentioned equation 1.

$$T_2 = Ta_2 + Tb_2 - Tc_2 - Td_2 - Tr_2 \quad (2)$$

The axial water thrust T as resultant of all stages is given by summing the above axial water thrusts of the lowpressure-stage and highpressure-stage as in following equation 3.

$$T = T_1 + T_2 \quad (3)$$

The water thrust T described above normally acts in the direction from the highpressure-stage to the lowpressure-stage, i.e. downward in FIG. 1 so as to thrust a rotational part of the hydraulic machine. Since an excessive water thrust T often brings on such accidents as damaging the thrust bearing of the generator or the motor directly coupled to the runner, it is a most important problem in the operation control to control the stability of the water thrust T, especially in a hydraulic machine including a runner on each stage and forming a complicated passage.

Under such circumstances, it is the situation that the multistage hydraulic machine having a reliable and adequate controlling means for the water thrust T is still not available since the multistage hydraulic machine per se is unperfected.

SUMMARY OF THE INVENTION

Accordingly, it is one object of this invention to provide a new and improved unique multistage hydraulic machine which has a simple, most reasonable and reliable controlling device for the water thrust T.

Briefly, in accordance with one aspect of this invention, a multi-stage hydraulic machine is provided an outer backchamber, an inner backchamber and a sidechamber around the guide vanes of each stage is provided and includes a first piping having a control valve and connected between the outer backchamber in the highest pressure-stage and the sidechamber in the lowest pressure-stage, and a second piping connected between the outer backchamber and the sidechamber in the highest pressure-stage.

BRIEF DESCRIPTION OF THE DRAWINGS

A more complete appreciation of the invention will be readily obtained as the same becomes better understood by reference to the following detailed description when considered in connection with the accompanying drawings, wherein.

DETAILED DESCRIPTION OF THE PREFERRED EMBODIMENTS

Figure 1:
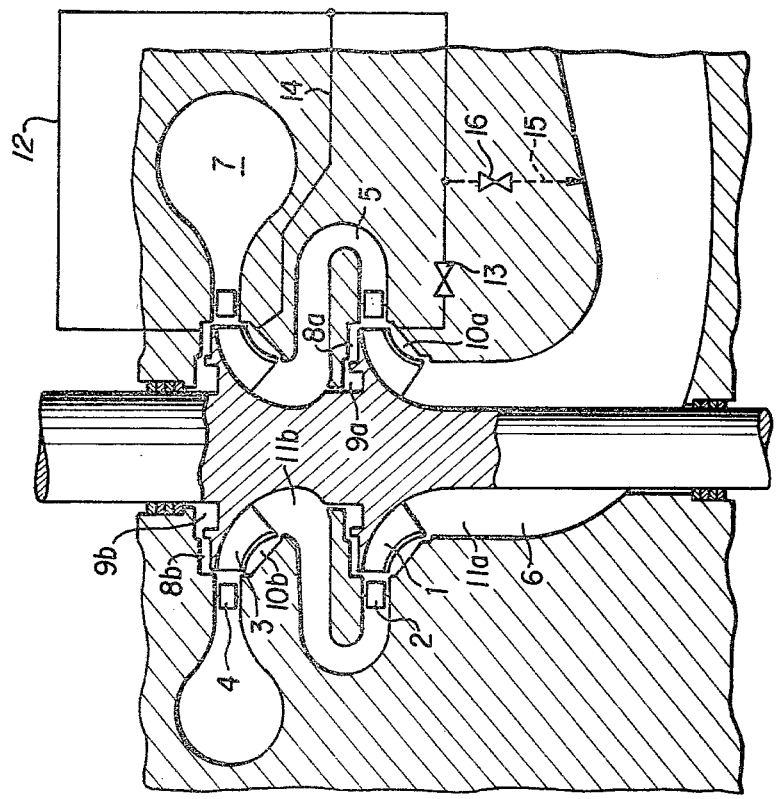
FIG. 1 is a sectional view of the prior multistage hydraulic machine.
Figure 2:
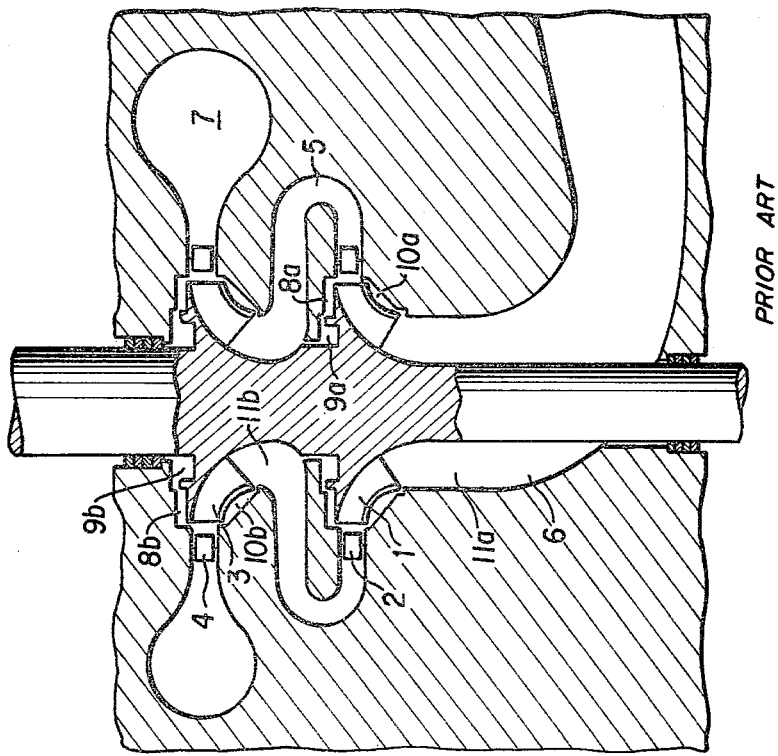
FIG. 2 is a sectional view of the multistage hydraulic machine according to this invention.

Referring now to FIG. 2, wherein like reference numerals designate identical or corresponding parts in FIG. 1, wherein one preferred embodiment of a multistage hydraulic machine in accordance with this invention is shown as including a piping 12 coupled between an outer back chamber 8b in the highpressure-stage and a sidechamber 10a in the lowpressure-stage through a control valve 13. Moreover, the outer backchamber 8b in the highpressure stage is also coupled to the sidechamber 10b by a piping 14, as shown in FIG. 2. Furthermore, the piping 12 coupled to the piping 14 is coupled to the draft tube 7 through the piping 15 having a control valve 16.

The multistage hydraulic machine of the invention constituted above operates as follows.

While the extremely simple structure of the piping 12 is provided to connect between the outer backchamber 8b in the highpressure-stage and the sidechamber 10a in the lowpressure-stage, the sidechamber 10a in the lowpressure-stage is pressurized by the highpressure water discharged from the highpressure-stage and the hydraulic load $Tc_1$ of the upward component is increased. At the same time, the outer backchamber 8b in the highpressure-stage is depressurized by the discharging operation to the lowpressure-stage, and the hydraulic load $Ta_2$ of the downward component is decreased.

For this reason, both the water thrust $T_1$ in the lowpressure-stage and the water thrust $T_2$ in the highpressure-stage restrain the component of the downward water thrusts. As a result thereof, it is possible to reduce the water thrust T at all stages.

In this case, by changing the opening of the control valve 13 provided to the piping 12, because it is possible to suitably adjust the highpressure water discharged from the highpressure-stage to the lowpressure-stage, it is possible to change the entire downward water thrust T to upward.

In this way, the stable controlling of the water thrust is easily accomplished.

Moreover, even if the chamber 8b in the highpressure-stage is depressurized by the discharging of the highpressure water to the lowpressure-stage, since the sidechamber 10b is connected with the outer backchamber 8b via the piping 14, it is apparent that the water pressure of the sidechamber 10b is equalized to that of the outer backchamber 8b. That is to say, if the water load $Ta_2$ of the outer backchamber 8b is decreased, since the water load $Tc_2$ of the sidechamber 10b is also decreased in proportion to the corresponding quantity decreased, the water thrust $T_2$ in the highpressure-stage, after all, does not change.

On the entire water thrust T, by adjusting only the water thrust $T_1$ in the lowpressure-stage there is an effect such that the stable controlling is still more suitably accomplished.

In the flow passage of the multistage hydraulic machine the water pressure in the draft tube 6 located on the lowpressure-stage is usually the lowest. Under the condition that the level of the adjusting water pressure is decreased in general, it is possible to achieve still more safety by providing the piping 15 to connect between the pipings 13 and 14 described above and the draft tube 6.

That is to say, by changing the opening of the control valve 16 provided on the piping 15, it is possible to safely carry out the stable controlling of the water thrust under the safety condition that the entire water pressure level of the pipings 12 and 14 is depressurized by discharging from the pipings 12 and 14 to the draft tube 6 through the piping 15.

Moreover, according to this method, there is an effect that an excessive water pressure on the piping is avoided.

In addition to the other effects, according to this invention, there are obtained the multiple-effects that the driving torque of the turbine is reduced when the runner rotates in air as the pump starts or the turbine condenser operation is carried out.

Namely, although it is questionable that the driving torque of the runner rotated in air is increased due to the leakage of water from the guide vanes 2 and 4 into the corresponding runner 1 and 3, according to this invention, by guiding their leakage water from the sidechambers 10a and 10b connected with the outer portion of the runner via the pipings 12 and 14, and by discharging the water to the draft tube 6 via the piping 15, it is possible to prevent the leakage water for going into the runners and to control the driving torque of the runner to be minimized.

Thus, it is possible to reduce the capacity of a prime mover, such as a motor, for driving the runners.

Obviously, many modifications and variations of this invention are possible in light of the teachings of this invention. It is therefore to be understood that within the scope of the appended claims, the invention may be practiced otherwise than as specifically described herein.

What is claimed as new and desired to be secured by Letters Patent of the United States is:

1. In a multistage hydraulic machine having guide vanes for each said stage, said machine being provided with an outer backchamber, an inner backchamber and a sidechamber around the guide vanes of each stage, the improvement comprising a first piping having a control valve and connected between the outer backchamber in the highest pressure-stage and the sidechamber in the lowest pressure-stage, and a second piping connected between the outer backchamber and the sidechamber in the highest pressure-stage.

2. A multistage hydraulic machine according to claim 1, which further comprises a third piping having a control valve and connected between the first and second pipings and a draft tube.

3. A multistage hydraulic machine according to claim 2, wherein an axial water thrust of all stages is controlled by adjusting of the control valve of the first piping.

4. A multistage hydraulic machine according to claim 2, wherein an axial water thrust of all stages is controlled by adjusting of the respective control valve of the first and second pipings.

* * * * *